Oct. 26, 1965
E. R. WOC ETAL
3,213,660
FORMING STABILIZER
Filed Feb. 19, 1963
3 Sheets-Sheet 1
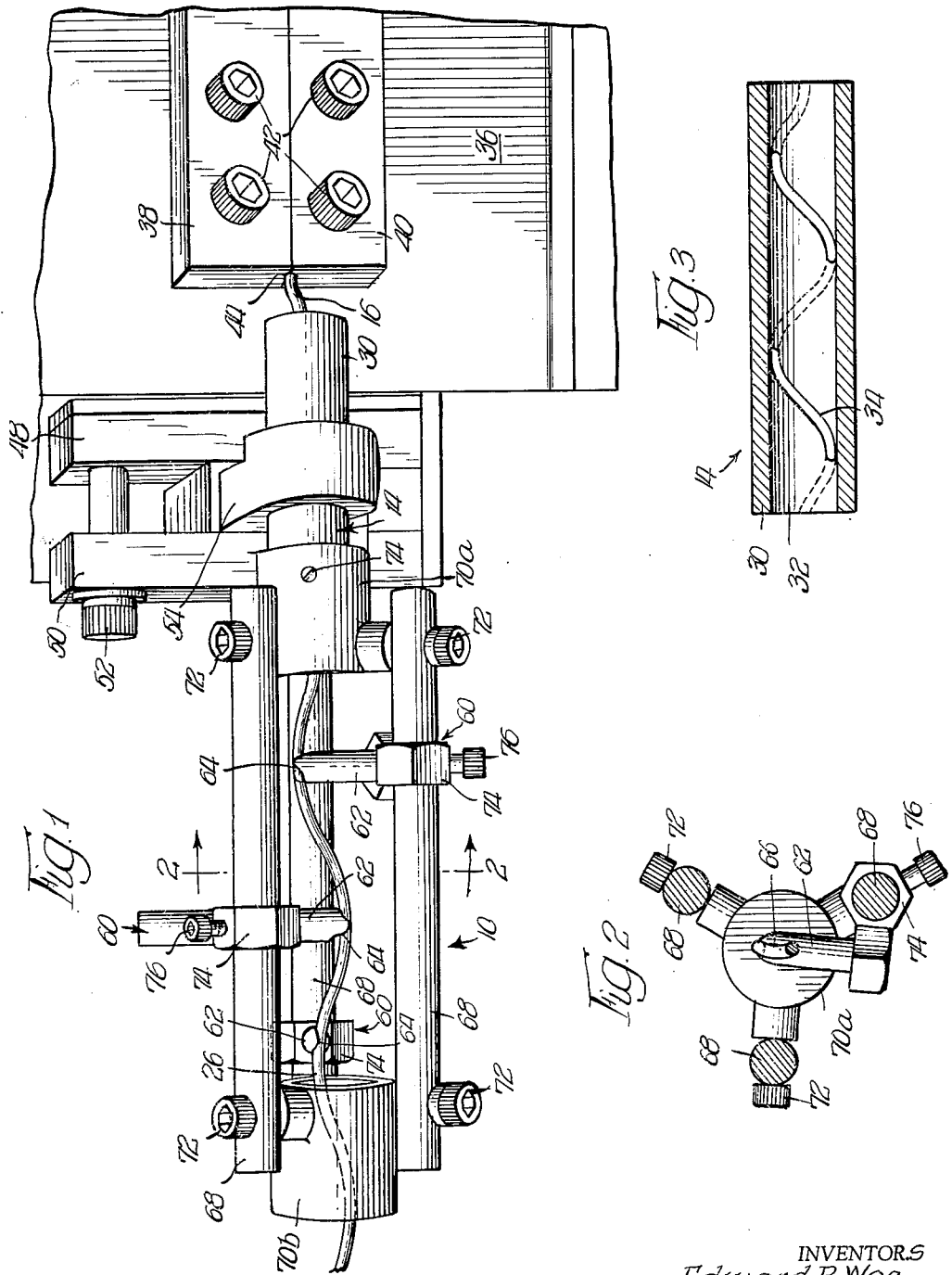
INVENTORS
Edward R. Woc,
BY William M. Maynard,
Byron, Hume, Groen + Clement
ATTYS.

Oct. 26, 1965
E. R. WOC ETAL
3,213,660
FORMING STABILIZER
Filed Feb. 19, 1963
3 Sheets-Sheet 2
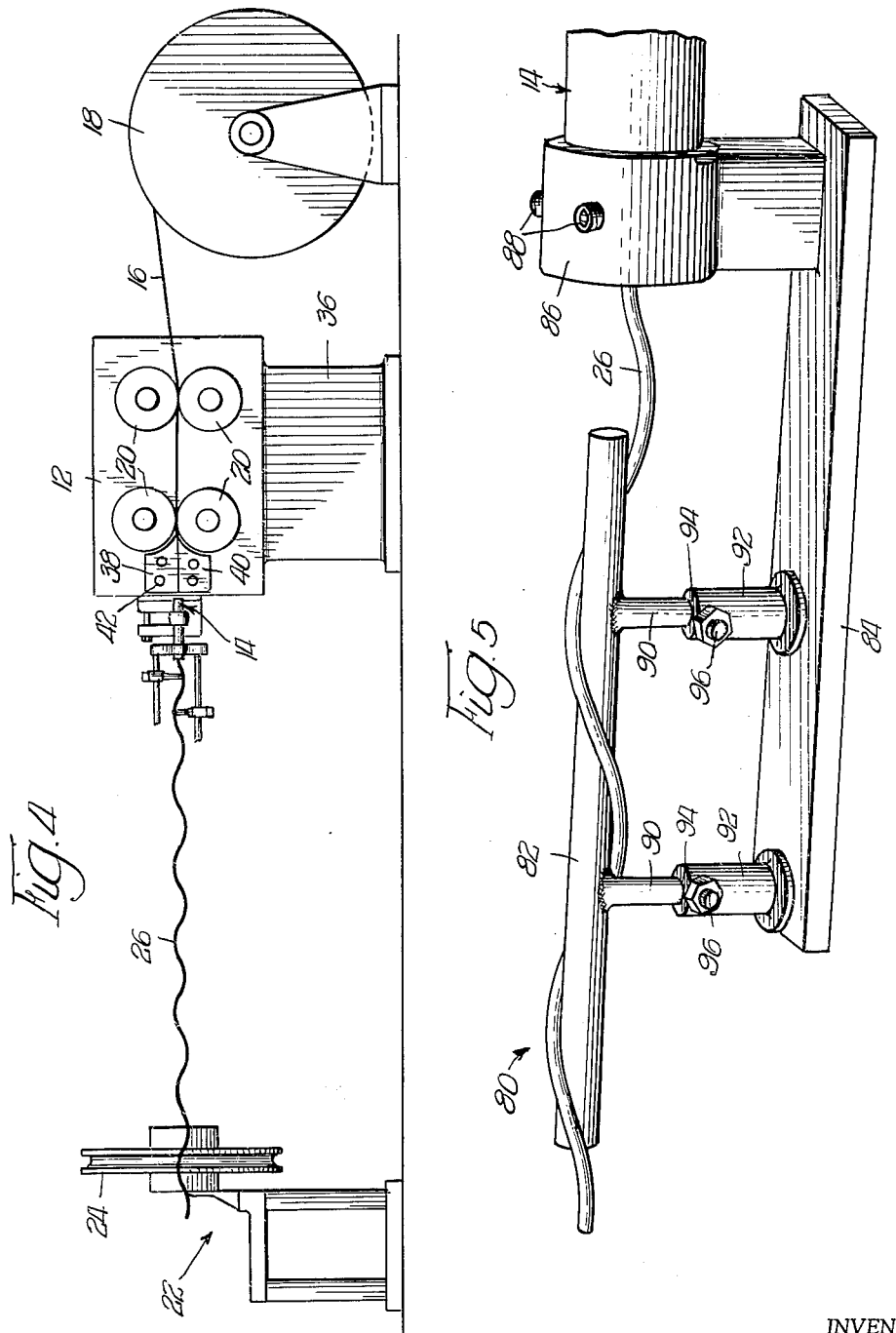
INVENTORS
Edward R. Woc,
William M. Maynard,
BY Byron Hume, Groen + Clement
ATTYS Oct. 26, 1965     E. R. WOC ETAL     3,213,660
FORMING STABILIZER
Filed Feb. 19, 1963     3 Sheets-Sheet 3
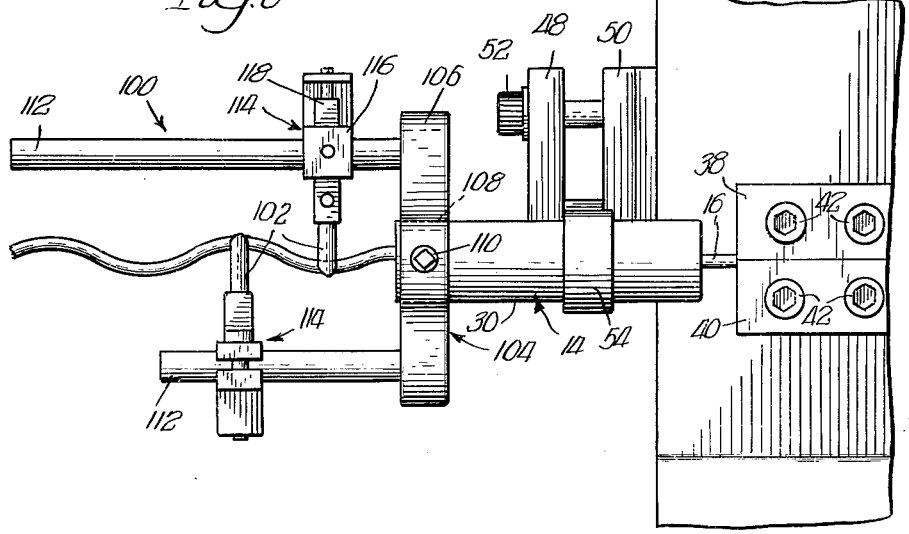
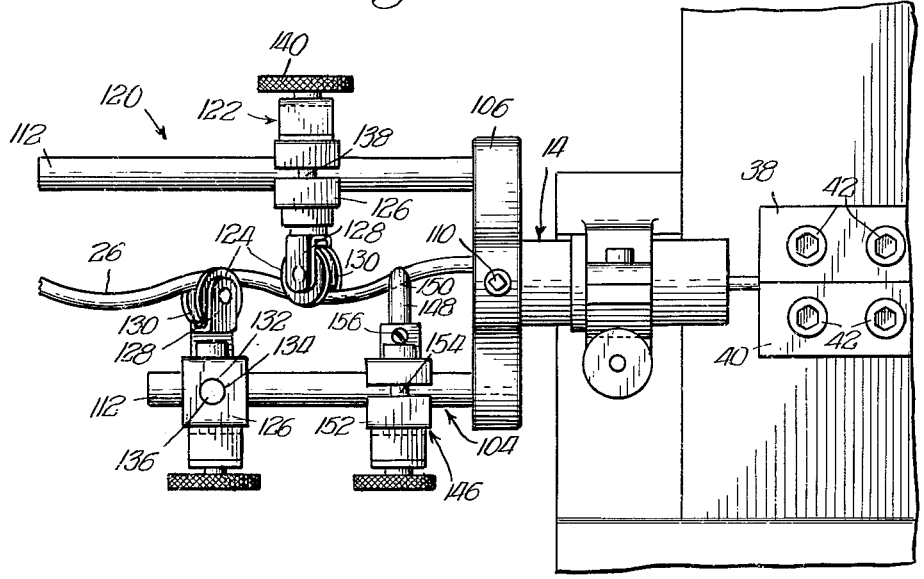
INVENTORS
Edward R. Woc,
BY William M. Maynard,
ATTYS

United States Patent Office 3,213,660
Patented Oct. 26, 1965

3,213,660
FORMING STABILIZER
Edward Robert Woc and William M. Maynard, Painesville, Ohio, assignors to Preformed Line Products Company, Cleveland, Ohio, a corporation of Ohio
Filed Feb. 19, 1963, Ser. No. 259,537
13 Claims. (Cl. 72—77)

This invention pertains to an apparatus for manufacturing helically shaped elements and in particular helically shaped elements that are used in the construction of appliances for linear bodies. Examples of such appliances are shown in the patents to Peterson of which the following are representative: 2,587,521, 2,609,653, 2,722,393, 2,729,054, 2,744,707 and 2,929,195, all of which are assigned to the same assignee.

As can be seen from the aforementioned patents the appliances are constructed of a plurality of helically formed rods or wires which are of a mutually conforming pitch length and internal diameter. The rods may be applied to linear bodies such as cables, electrical conductors, wires and the like. Such appliances have many inherent advantages over the previously used prior art devices and as a direct result have enjoyed considerable commercial success.

The helically formed elements are constructed by progressively imparting a helical configuration to a selected wire, rod or the like. This helical forming is usually conducted on a continuous basis where the wire is supplied from a large reel containing several hundred feet. After the helices are formed they are then cut into pre-selected lengths suitable for assembly into the final form.

In order for the helical elements to perform in the desired manner it is essential that they be of mutually conforming configurations both as to pitch length and internal diameter. It has been found that many times for the same die setting, the finished dimensions of the helix, i.e., pitch length and internal diameter, will vary within wide ranges. This variation may be the result of any one or more of several causes such as variations in hardness, ductility, chemical composition, metallographic characteristics and the like. Thus for the same reel, the dimensions of the helix may vary considerably even though the die setting has remained substantially constant. As a result of the variations in dimensions regardless of the cause, there is an unduly large percentage of scrap. Such scrap represents an inefficiency or waste of time, material and effort.

As a result of the foregoing we have invented an apparatus by which the variations in the manufactured dimensions for a single die setting can be materially reduced. Another feature of the invention resides in the fact that it may be used in conjunction with the helically forming apparatus utilized heretofore. The subject invention requires little if any alteration of the conventional forming apparatus other than the mounting of such invention on such apparatus.

Another feature and object of the invention resides in the provision of an apparatus that is of a relatively simple and inexpensive construction.

The invention may be briefly described as a means which is used in conjunction with the die means for imparting the helical configuration to the wire, and which engages the wire as it issues from the first die means and forces it to radially expand beyond its elastic limit. It has been found that such expansion results in a uniformity of dimension and in many instances has reduced the scrap rate ten-fold.

The above features and objects of the invention will be apparent upon reading the specification with reference to the following drawings.

FIGURE 1 is an elevational view of one form of the invention;
FIGURE 2 is a sectional view taken along the lines 2—2 in FIGURE 1;
FIGURE 3 is a sectional view of the first die member;
FIGURE 4 is a schematic illustration of the entire apparatus for manufacturing helically configurated rods including the cut-off apparatus for chopping the same into pre-selected lengths; and
FIGURE 5 is an elevational view of a modification of the invention; and
FIGURE 6 is an elevational view of another modification of the invention.

It will be understood that while the subject invention as described in conjunction with helically configurated elements used in the construction of the appliances of linear bodies that this is merely by way of example and is not to be construed as a limitation. The subject invention may be utilized with any helically formed product that is similar in construction to the helically configurated elements even though the uses are dissimilar. The inventive apparatus may be constructed of any suitable materials that will permit it to function in the manner intended.

Before attempting to explain the constructional features of the invention the entire forming apparatus will be briefly described with reference to FIGURE 4. The forming apparatus 12 includes a forming die 14 of some suitable type which is adapted to receive the wire 16 from a suitable source such as the reel 18 and to progressively impart a helical configuration therein. The helically configurated wire when used in the construction of the aforementioned appliances will generally be of an open pitch and internal diameter so that it may be applied from the side to a linear body. The wire 16 is forced through the die 14 by any suitable means such as the feed rolls 20 which precede the die 14. After the wire has been helically formed it is then chopped off in pre-selected lengths by the cutter 22. The cutter 22 may be of any suitable type or design, one of which is shown in the co-pending application of Bonds, Serial No. 55,570, entitled, Wire Cutting Mechanism, and filed March 22, 1957. The cutter comprises a retractable knife (not shown) mounted on a rotary fly wheel 24. The knife is adapted to extend at pre-determined intervals so as to pass through the path of the helically formed element 26, thus cutting it into the pre-selected lengths.

Referring to FIGURE 3, the die member 14 as seen in section comprises a cylindrical housing 30 in which is disposed a cylinder 32. The cylinder 32 is provided with a helical groove 34 which extends around the periphery thereof from one end to the other. As the wire is threaded through the helical groove 34 it is forced to assume a complementary configuration of a substantially identical pitch length and internal diameter. It will be noted, however, that when the wire issues from the trailing end of the helical groove 34 there is some tendency for it to relax or to return to its unformed configuration. This tendency is manifested by a slight opening of the helical diameter.

The die 14 is mounted on a suitable base 36 to which are secured the feed rolls 20. The base is further provided with the guide blocks 38 and 40 which are secured in place by the bolts 42. The guide blocks 38 and 40 are provided with a semi-cylindrical groove so that when placed in touching relationship form a cylindrical groove 44 of approximately the same diameter as the wire 16. As the wire 16 issues from the guide blocks 38 and 40 it is received in the forming die 14.

The die 14 is mounted on the base 36 by means of the brackets 48 and 50 which are secured in place by the bolts 52, as can be seen in FIGURE 1. The brackets 48 and 50 engage the collar assembly 54 in which is mounted the cylindrical housing 30 of the die 14. While one specific type of a die and helical forming have been shown, it is to be understood that this is merely by way of example. The helical formation may be carried out by any suitable method or apparatus.

The stabilizing apparatus 10 includes a plurality of forming assemblies 60 which engage the internal surface of the helix after it issues from the first die member 14. A shown in FIGURE 1, there are three assemblies in this embodiment of the invention. Each of the assemblies 60 includes a rodlike member 62 which includes a groove 64 in one end thereof. The groove 64 represents a segment of the helical configuration and is adapted to receive the helical wire 26. As mentioned previously, the forming members 62 engage the helical wire 26 along the internal surface. By the internal surface it is meant that portion of the wire surface which is adjacent the inner circular periphery projected by the helix which has been designated by the numeral 66 in the FIGURE 2. The forming members 62 are positioned so as to expand the helix radially outward so as to increase its internal diameter. As will be described more fully later on, the magnitude of the expansion is sufficient to exceed the elastic limit of the element.

As shown in FIGURE 1, the forming members 62 are oppositely disposed so as to provide a balanced relationship between the respective forces exerted thereby. Specifically, the forming members are disposed at 120° with respect to the other forming members. As can be seen hereafter forming members are advantageously disposed at angular intervals equal to 360° divided by the number of forming members. Thus if two forming members are used they will be disposed at 180° with respect to each other or in other words in diametrically opposed relationship. Moreover if four are used they would be disposed at 90° intervals and if five they would be disposed at 72° intervals, etc.

The forming members 62 are supported by the frame assembly composed of the rod members 68. The rod members are secured at their ends to the annular members 70a and 70b by means of the bolts 72. The annular member 70a is received on the forming die 14 and held in place by the set screws 74. In this manner the annular members 70a and 70b and the frame assembly 68 are substantially co-axial with the die member 14.

As shown in FIGURE 1, each of the assemblies 60 is mounted on a rod 68, and includes a collar 74 which is secured in place by means of a set screw 76. The collar 74 may be selectively positioned along its respective rods 68 so that the forming members may be adjusted to accommodate various pitch lengths. The forming members 62 are disposed so as to divide the pitch length into two equal sections. The first and third forming members 62 could be considered to be positioned at the beginning and end of a pitch length with the intermediate forming member being positioned at the mid-point.

It will be understood that in radially expanding the helix beyond its elastic limit there is a permanent increase in the internal helical diameter. Accordingly, it is necessary that the helix be formed to an internal diameter as it issues from the die member 14, slightly less than that desired. This is a simple matter of relative adjustment which generally may be accomplished without the necessity of altering the die member 32 or the helical path 34 therein but simply by rotating the cylinder 32 with respect to the guide blocks 38 and 40.

Referring now to FIGURE 5 there is shown a modification of the invention as generally denoted by the numeral 80. This modification comprises a cylindrical member 82 which is mounted co-axial with the die member 14. The helically formed wire 26 issuing from the die member 14 is threaded around the cylinder 82 as shown in FIGURE 5. The diameter of the cylinder 82 is slightly larger than the internal diameter of the helix 36. Thus in passing over the cylinder 82 the helix 26 is forced to expand. In the preferred embodiment the expansion is sufficient to slightly exceed the elastic limit of the helix, thus causing it to assume a slightly larger internal diameter. The results obtained from the embodiment shown in FIGURE 5 are substantially the same as that obtained from FIGURE 1 in that it minimizes dimensional variations.

The cylinder 82 is mounted by means of the bracket 84 which is attached to the die member 14 by means of the collar 86. The collar 86 is fixed in place by the set screws 88. The cylinder 82 is secured to the bracket 84 by the posts 90 which are received in the base members 92 which are in turn mounted on the bracket 84. The base members 92 are each provided with an aperture 94 which slidably receives the respective posts 90 so as to be vertically adjustable therein. The posts 90 may be fixed at a desired height by the set screws 96.

Referring now to FIGURE 6, there is shown another modification of the invention, generally denoted by the numeral 100. In this modification, the invention includes only two forming members 102. The forming members are mounted by means of the frame assembly 104 which includes the yoke plate 106. The yoke plate is provided with a centrally located aperture 108 in which is received the die member 14 and is secured in place by the set screw 110. At the ends of the yoke plate 106 are mounted the rods 112 while extend substantially parallel to the axis of the helix as it issues from the die member 14.

The forming members 102 are mounted respectively on the rods 112 so as to be in opposing or 180° relationship. The forming members 102 are mounted by means of the assemblies 114 which include the collars 116 slidably positioned on the rods 112 and which are secured in place by means of the set screws 118. As a result of this arrangement, the forming members 102 may be selectively positioned in order to accommodate various pitch lengths. The forming members 102 are received within the apertures 117 in the collars 116 and may be extended or contracted to accommodate helices of various internal diameters. The forming members 102 are fixed in position by the set screws 117a.

As shown in FIGURE 6 the forming members 102 are positioned approximately one-half pitch length apart. Thus it could be considered that the forming member on the right contacts the helix at the beginning of a pitch length with the forming member on left contacting the same pitch length at its mid-point.

The operation of the construction shown in FIGURE 6 is substantially the same as that described previously. Specifically, the forming members are positioned so as to radially expand the helix as it issues from the die and to cause the same to assume an internal diameter slightly larger than when it issues from the die member 14.

Referring now to FIGURE 7 there is shown another modification which is somewhat similar to that illustrated in FIGURE 1 in that there are three forming members but in which two of the forming members 122 are of a different construction. In this embodiment 120 the forming assemblies 122 are mounted on the frame assembly 104. The frame assembly 104 includes the yoke plate 106 and the two rods 112 arranged in the same fashion as described in FIGURE 6.

The forming members 122 include the rotatable wheel members 124 which are mounted by means of the collars 126 on the rods 112. The collars 126 are secured in place by means of the screws 138 which are provided with the knurled knobs 140 for facilitating the manipulation thereof. The wheels 124 are secured to the collars 126 by means of the yokes 128. Each of the wheels 124 is provided with a peripheral groove 130 in which is received the helix 26. The wheels 124 are rotatable about their own axis and also about their vertical diameter for purposes of positioning as will be explained more fully later on. As a result of their axial rotatability the wheels rotate with movement of the helix 26, thus minimizing wear due to friction that might ordinarily be present with the grooved end forming members which has been described previously.

Each of the yokes 128 is secured to the collar by means of a stem 132 which is received within an appropriate aperture 134. The stem 132 may be slidably positioned within the aperture 134 and then fixed in place by a set screw 136. Thus the wheels may be positioned so as to accommodate helices of various internal diameters and thus expand each a pre-determined amount so as to achieve the desired effect. The stem 132 is rotatable within the apertures so that the wheel secured thereto may be positioned whereby the portion of the groove 130 at the point of contact with the helix will generally directionally conform thereto. Once the wheel has been properly oriented, the stem 132 is then fixed in place by a set screw 136.

In combination with the forming assemblies 122 is a third assembly 146 which includes a rodlike forming member 148 having a groove 150 in its end. The rod 148 is secured to the rod 112 by means of a collar 152 which in turn is fixed in place by means of a set screw 154. The rod 148 may be extended or contracted to a desired length and then fixed in such position by means of the set screw 156.

The operation of the modification shown in FIGURE 7 is substantially the same as those modifications previously described. Specifically, the forming assembly forces the helix to radially expand slightly beyond its elastic limit so as to have an internal diameter measurably greater than when issuing from the forming die 14. It will be apparent that the modification shown in FIGURE 7 may include three of the wheel assemblies and thus eliminate the rod type assembly 146.

Although certain specific forms of the invention have been described hereinbefore, it is to be understood that these are by way of example. It will be apparent to those skilled in the art that certain modifications may be made within the scope of the attached claims without departing from the spirit of the invention.

We claim:

1. Apparatus for manufacturing helically configured elements comprising a die means for imparting a helical configuration to a wirelike element, and means for receiving the helically configured element as it issues from said die means, said means comprising a plurality of forming members successively spaced from said die means and contacting said helically configured element on the internal surface thereof so as to radially expand said helically configured element beyond its elastic limit.

2. Apparatus for manufacturing helically configured elements comprising a die means for imparting a helical configuration to a wirelike element, and means for receiving the configurated element as it issues from die means, said means comprising first and second forming members contacting said helically configured element in opposing directions on the internal surfaces thereof so as to radially expand said helically configured element beyond its elastic limit.

3. In an apparatus for manufacturing helically configurated elements of a predetermined pitch length and internal diameter and having means for imparting a helical configuration having a pitch length and internal diameter substantially equal to said predetermined pitch length and internal diameter to a wirelike element, the invention comprising means for receiving the helically configured element as it issues from said means for imparting and for radially expanding said helically configured element beyond its elastic limit.

4. The invention according to claim 3 in which said radially expanding means is further characterized as a cylinder having a diameter materially greater than the internal diameter of the helically configurated element.

5. Apparatus for manufacturing helically configurated elements comprising a die means for imparting a helical configuration to a wirelike element, said die means including a cylindrical member having a helical groove extending around the periphery thereof, means for forcing a wirelike element through said helical groove, and a means substantially co-axial with said cylindrical member for receiving the helically configurated element issuing from said die means, said means comprising a plurality of forming members adapted to contact said helically configurated element in a balanced relationship on the internal surfaces thereof so as to radially expand said helically configurated element beyond its elastic limit.

6. Apparatus for manufacturing helically configurated elements comprising a die means for imparting a helical configuration to a wirelike element, said die means including a cylindrical member having a helical groove extending around the periphery thereof, means for forcing a wirelike element through said helical groove, and means substantially co-axial with said cylindrical member for receiving the helically configurated element issuing from said die means, said means comprising a plurality of forming members adapted to contact said helically configurated element in a balanced relationship on the internal surfaces thereof so as to radially expand said helically configurated element beyond said elastic limit, each of said forming members comprising a fingerlike element having a groove in one end thereof for receiving said helically configurated element.

7. Apparatus for manufacturing helically configurated elements comprising a die means for imparting a helical configuration to a wirelike element, said first die means including a cylindrical member having a helical groove extending around the periphery thereof, means for continually forcing a wirelike element through said helical groove, and a means substantially co-axial with said cylindrical member for receiving the helically configurated element issuing from said first die means, said means having forming members adapted to contact said helically configurated element in a balanced relationship on the internal surfaces thereof so as to radially expand said helically configurated element beyond its elastic limit, each of said forming members comprising a fingerlike element having a groove in the end thereof for receiving said helically configurated element as it passes through said means, said plurality of forming members being adjustable relative to each other and to said die means to accommodate various pitch lengths.

8. Apparatus for manufacturing helically configurated elements comprising a die means for imparting a helical configuration to a wirelike element, said die means including a cylindrical member having a helical groove extending around the periphery thereof, means for continuously forcing a wirelike element through said helical groove, and a means substantially co-axial with said cylindrical member for receiving the helically configurated element issuing from said die means, said means comprising a plurality of forming members adapted to contact said helically configurated element in a balanced relationship on the internal surfaces thereof so as to radially expand said helically configurated element beyond its elastic limit, each of said forming members mounted on at least one rodlike element extending substantially parallel with the axis of said cylindrical member, forming members being slidable on said mounting member along the axis thereof so as to be relatively adjustable as to their spacings, each of said forming members having a groove therein for receiving said helically configurated element as it passes through said cylindrical die means.

9. Apparatus for manufacturing helically configurated elements comprising a die means for imparting a helical configuration to a wirelike element, said die means including a cylindrical member having a helical groove extending around the periphery thereof, means for continuously forcing a wirelike element through said helical groove, and a means substantially co-axial with said cylindrical member for receiving the helically configured element issuing from said die means, said means comprising a plurality of forming members adapted to contact said helically configured element in a balanced relationship on the internal surfaces thereof so as to radially expand said helically configured element beyond its elastic limit, each of said forming members comprising a rotatable wheel having a groove extending around the circumference thereof for receiving said helically configured element as it passes through said means.

10. In an apparatus for manufacturing helically configurated elements and having means for imparting a helical configuration to a wirelike element, the invention comprising means for receiving the helically configurated element as it issues from said means for imparting and for radially expanding said helically configured element beyond its elastic limit, said means including a plurality of forming members successively spaced from said means for imparting, each of said forming members comprising a fingerlike element having a groove in one end thereof for receiving said helically configured element.

11. In an apparatus for manufacturing helically configurated elements and having means for imparting a helical configuration to a wirelike element, the invention comprising means for receiving the helically configurated element as it issues from said means for imparting and for radially expanding said helically configured element beyond its elastic limit, said means including a plurality of forming members successively spaced from said means for imparting, each of said forming members comprising a rotatable wheel having a groove in the circumference thereof for receiving said helically configured element.

12. A method for manufacturing a helically configurated element having a predetermined pitch length and internal diameter comprising progressively forcing a wirelike element through a die member having a helical groove therein to form a helical shape of open pitch and interval diameter substantially equal to said predetermined pitch length and internal diameter, and progressively radially expanding the helix after it issues from said die member so as to exceed the elastic limit thereof.

13. A method for manufacturing a helically configurated element having a predetermined pitch length and interval diameter comprising progressively forcing a wirelike element through a die member having a helical groove therein to form a helical configuration of open pitch and internal diameter substantially equal to said predetermined pitch length and internal diameter, and exerting a force on the internal surface of said helically configured element after it issues from said die member so as to progressively radially expand said helix to an extent sufficient to exceed the elastic limit thereof.

References Cited by the Examiner

UNITED STATES PATENTS 2,749,962   6/56   Kitselman _____ 153—64

FOREIGN PATENTS 872,403   7/41   Great Britain.

CHARLES W. LANHAM, *Primary Examiner.*

UNITED STATES PATENT OFFICE
CERTIFICATE OF CORRECTION

Patent No. 3,213,660            October 26, 1965

Edward Robert Woc et al.

It is hereby certified that error appears in the above numbered patent requiring correction and that the said Letters Patent should read as corrected below.

Column 4, line 28, for "while" read -- which --; column 8, lines 7 and 14, for "interval", each occurrence, read -- internal --.

Signed and sealed this 28th day of June 1966.

(SEAL)
Attest:

ERNEST W. SWIDER            EDWARD J. BRENNER
Attesting Officer            Commissioner of Patents